United States Patent Office 3,283,032
Patented Nov. 1, 1966

3,283,032
METHOD OF CROSSLINKING UNSATURATED POLYESTERS BY DIELS-ALDER REACTION WITH A MONOMER CONTAINING TWO PAIRS OF CONJUGATED ETHYLENIC LINKAGES
Richard John Martin, Cambridge, Bryan Dobinson, Duxford, and Bernard Peter Stark, Stapleford, England, assignors to Ciba Limited, Basel, Switzerland, a Swiss company
No Drawing. Filed Nov. 29, 1963, Ser. No. 327,085
Claims priority, application Great Britain, Dec. 3, 1962, 45,705/62
1 Claim. (Cl. 260—867)

This invention relates to curable unsaturated resin compositions.

This invention is based on the discovery that curable compositions may be made by mixing unsaturated compounds containing on average more than two aliphatic double carbon-carbon bonds per molecule with lactones containing an $\alpha,\gamma$-diene group or with compounds containing two 1,3-diene groups.

The present invention provides especially curable compositions comprising at least one unsaturated compound possessing a total ethylenic bond equivalence greater than two, and either at least one compound of the Formula I:

in which $R_1$, $R_2$, $R_3$ and $R_4$ each represents hydrogen or a monovalent substituted or unsubstituted alkyl or alkoxycarbonyl group, or at least one compound of the general Formula II:

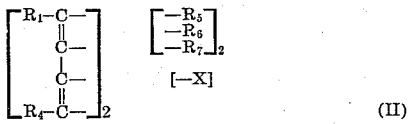

in which $R_1$, $R_4$, $R_5$, $R_6$ and $R_7$ separately represent hydrogen or halogen atoms, or monovalent substituted or unsubstituted alkyl or aryl groups, or $R_5$, $R_6$ and $R_7$ separately represent such atoms or groups while $R_1$ and $R_4$ together represent a polyalkylene group, and X represents a divalent organic residue linking two of the indicated diene systems and has, for example, one of the following structures:

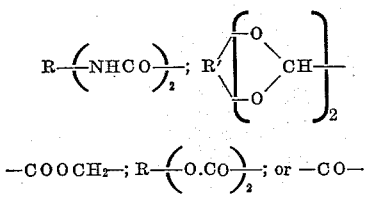

$-COOCH_2-$; $R-(-O.CO-)_2$; or $-CO-$ (wherein R represents a divalent substituted or unsubstituted aliphatic or cycloaliphatic hydrocarbon residue in which the chain of carbon atoms may be interrupted by oxygen atoms, and $R^1$ represents a tetravalent aliphatic or cycloaliphatic hydrocarbon residue) or at least one compound isomeric with a compound of Formula II and convertible thereinto under curing conditions. Examples of compounds isomeric with compounds of Formula II and convertible thereinto under curing conditions are compounds containing 1,4-diene systems.

In accordance with a feature of the invention, hardened, cross-linked resins are produced by heating together the constituents of the aforesaid new compositions. The hardened resins so produced are also within the scope of the invention.

Should the unsaturated compound which is mixed with a compound of Formula I, or II or an isomer thereof, be a single chemical compound, it should contain three or more non-aromatic C=C double bonds per molecule. Otherwise, as in many practically important cases (as with the preferred unsaturated linear polyesters), the unsaturated compound may consist of a mixture of compounds possessing different molecular weights and C=C bond contents. In such cases, the average multiple-bond content need not be a whole number, but must be greater than 2.0.

The following classes of unsaturated substances are of special interest in connection with the present invention.

(a) Unsaturated polyesters derived from unsaturated di- or poly-carboxylic acids and saturated aliphatic or aromatic diols or polyols, which may optionally be modified with saturated di- or poly-carboxylic acids. Unsaturated di- and poly-carboxylic acids from which such polyesters may be derived include: maleic acid; fumaric acid; citraconic acid; itaconic acid; tetrahydrophthalic acid; and aconitic acid. Diols and polyols from which the polyesters may be derived include, for example: ethylene glycol; diethylene glycol; propane-1,2-diol; propane-1,3-diol; butane-1,4-diol; 2-methylpentane-2,4-diol; pentane-1,5-diol; hexane-1,6-diol; the bis($\beta$-hydroxyethyl)ethers of Bisphenol A (2,2'-bis(p-hydroxyphenyl)propane) and tetrachloro-Bisphenol A; glycerol; diglycerol; 1,1,1-trimethylolethane; 1,1,1-trimethylolpropane; butane-1,2,4-triol; hexane-1,2,6-triol; pentaerythritol; and $\alpha$-(pentachlorophenyl)-glyceryl ether. Saturated di- and poly-carboxylic acids which may be used to modify the unsaturated polyesters include, for example: oxalic acid; succinic acid; glutaric acid; adipic acid; pimelic acid; azelaic acid; sebacic acid; hexahydrophthalic acid; tricarballylic acid; phthalic acid; isophthalic acid; terephthalic acid; naphthalene-2,6-dicarboxylic acid; diphenyl-o,o'-dicarboxylic acid; ethylene glycol bis-(p-carboxyphenyl)ether; tetrachlorophthalic acid; hexachloroendomethylenetetrahydrophthalic acid; and tetrachlorosuccinic acid.

(b) Unsaturated polyesters derived from aliphatic or cycloaliphatic unsaturated di- or polyols and unsaturated di- or poly-carboxylic acids, which may optionally be modified with saturated di- or polyols and/or saturated di- or poly-carboxylic acids. Unsaturated polyols from which such polyesters may be derived include, for example: 1,4-dihydroxy-but-2-ene; 1,6-bis(hydroxymethyl)-2,5 - endomethylenecyclohex - 3 - en; 1,1 - bis(hydroxymethyl)cyclohex-3-ene; and 1,1-bis-(hydroxymethyl)-6-methylcyclohex-3-ene.

The unsaturated di- or poly-carboxylic acids, and the saturated di- or poly-carboxylic acids and saturated di- or polyols which may optionally also be used in the preparation of the polyesters of class (b) include those listed in section (a) above.

(c) Esters derived from aliphatically unsaturated monocarboxylic acids, such as acrylic acid, methacrylic acid, crotonic acid, cinnamic acid, furylacrylic acid, oleic acid, linoleic acid, ricinoleic acid, and soya fatty acid, with tri- or poly-hydroxy compounds, such as glycerol, 1,1,1-trimethylolpropane, 1,1,1-trimethylolethane, pentaerythritol, hydroxyethylated or hydroxypropylated Novolaks, and polyglycerol ethers of polyhydric phenols. Such esters include, for example: glycerol triacrylate, glycerol trioleate, and naturally-occurring plant or animal unsaturated oils, such as linseed oil, tung oil, and fish oil.

(d) Esters derived from aliphatically unsaturated dior poly-carboxylic acids, such as maleic acid, fumaric acid or itaconic acid, and aliphatically unsaturated monohydric alcohols, such as allyl alcohol or crotyl alcohol. Such esters include, for example, diallyl maleate and dicrotyl maleate.

It is believed that, in the absence of an initiator of free radical polymerisation, the reaction between a compound of Formula I or II and the unsaturated compound results in cross-linking by way of the well-known Diels-Alder reaction—the compound of Formula I or II reacting as the diene and the unsaturated substance behaving as the dienophil. When, in place of a compound of Formula II, a compound isomeric with, and capable of transformation to, a compound of Formula II is used, this transformation is assumed to precede the Diels-Alder reaction. Accelerators for the Diels-Alder reaction, such as aluminium chloride, may if desired be included in the compositions of the invention; inhibitors of free-radical polymerisation may also optionally be incorporated in the compositions. When the reactants and reaction conditions are such that cross-linking is wholly or predominantly due to Diels-Alder addition, the preferred ratio of actual or potential

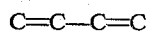

units to C—C double bonds present in the dienophiles is generally approximately one, although the ratio used in practice may lie within wide limits, such as 2:1–1:10.

In certain instances the compounds of Formula I or II, or the transformable isomers as defined above, can undergo homo- or copolymerisation. In such cases it is possible to add to the compositions of the invention a polymerisation initiator, such as a substance capable of initiating free-radical polymerisation, for example organic peroxides such as benzoyl peroxide. In addition, accelerators such as amines or metal compounds (e.g. vanadyl compounds) may be added. Alternatively, such mixtures may be hardened by the action of oxygen in the presence of siccatives such as cobalt naphthenate. In those cases where cross-linking of the hardenable mixtures occurs predominantly or entirely as a result of copolymerisation of compounds of Formula I or II with the unsaturated substances, additional copolymerisable monomers, such as styrene or divinyl benzene, may be added to the hardenable mixtures.

With hardenable compositions which contain compounds of Formula I the hardening is believed to occur as a result of three successive reactions:

(i) Diels-Alder addition of the compound of Formula I to the dienophilic unsaturated substance;

(ii) Expulsion of a volatile fragment O=C=O, with generation of a new C=C—C=C system; and (iii) Further Diels-Alder addition of this new conjugated system to the dienophile molecules. In such cases, the preferred ratio of dienophilic double bonds to total C=C—C=C conjugation (i.e. conjugation originally present plus conjugation generated as a result of process (ii)) is generally approximately one. In these special cases, carbon dioxide is eliminated as a gas during the hardening process; such mixtures are especially useful for the production of surface coatings.

It is already known that unsaturated compounds of the type defined above may be cross-linked by reaction with certain derivatives of thiophen dioxide. This process has been described as being useful for the production of surface coatings. However, sulphur dioxide is liberated during the cross-linking reaction, and this gas is under some circumstances objectionable. The compositions of the invention containing the unsaturated lactone of Formula I have the advantage that only the harmless carbon dioxide is liberated during the cross-linking.

In those cases where hardening of the compositions of the present invention is entirely or largely due to a Diels-Alder reaction the preferred hardening temperature is usually in the region 80–200° C. Where, however, the hardening occurs mainly as a result of copolymerisation, hardening under some circumstances is preferably effected at a lower temperature.

The invention is not, however, restricted to any particular reaction mechanisms or theory. Whatever may be the actual nature of the cross-linking reaction which occurs, it is found that technically-useful hardened, i.e. insoluble and infusible, products are obtained by reacting together compounds of the general Formula I or II with unsaturated substances of the type defined above. The hardened products obtained by this process are themselves a feature of the invention.

The new hardenable compositions may contain other hardenable resins such as, for example, phenoplasts, polyacetals derived from polyols and aldehydes, or epoxide resins, provided that these are compatible with the compound of Formula I or II and with the unsaturated substances described above, and provided that they harden under the same hardening conditions.

The compositions of this invention may also contain fillers, plasticisers, and colouring agents, for example asphalt, bitumen, glass fibres, mica, quartz powder, cellulose, kaolin, kieselguhr, finely-divided silica, such as that available under the registered trade name "Aerosil," or metal powder.

The compositions may be used in the filled or unfilled state, e.g. in the form of solutions or emulsions, as textile auxiliaries, laminating resins, varnishes, lacquers, dipping resins, casting resins, moulding resins, encapsulating, coating, filling and packing materials, adhesives and the like, as well as for the preparation of such materials.

The following examples illustrate the invention. All parts are by weight, unless otherwise specified. The Martens Points of the cured specimens were determined according to the D.I.N. Specification: values unqualified by the term "D.I.N." were determined according to a modified procedure in which a smaller sample is employed. Results obtained by the latter method, although only approximating to those obtained in the D.I.N. procedure, provide mutually comparable values. Gelation times were determined by means of a "Techne" gelation timer.

EXAMPLE I

Isophthalic acid (1245 parts), phthalic anhydride (222 parts) and propane-1,2-diol (1435 parts) were heated under nitrogen at 180°–210° C. and the water formed by the esterification was distilled through a fractionating column until the acid value of the mixture was less than 5. Maleic anhydride (881 parts) was then added, and esterification continued by heating the mixture at 200–220° C. until the acid value was 25. There resulted a solid polyester resin (3300 parts) ("Polyester A") with a softening point of 65° C. (Kofler block), a double-bond content of 2.74 equiv./kg. and an average molecular weight of 1930. To 80 parts of "Polyester A," heated to 120° C., was added diethylene glycol disorbate (29.6 parts) (prepared according to U.S. Patent No. 2,462,337, Example 1), with stirring. The resulting mixture was poured into an aluminium mould and heated for 3 hours at 160° C. to form a cured resin having a Martens (D.I.N.) value of 56° C., a flexural strength (V.S.M.) of 11.6 kg./mm.$^2$ and an impact strength (V.S.M.) of 12.5 cm. kg./cm.$^2$.

EXAMPLE II

To "Polyester A" (30 parts), heated to 100° C., was added ethylene glycol disorbate (10 parts) (prepared according to United States Patent No. 2,462,337, Example 2). The mixture was stirred, poured into aluminium moulds and heated at 155° C. to yield a cured resin having a Martens value of 59° C. after 50 minutes, and 87° C. after 16 hours.

EXAMPLE III

A mixture of xylene (1000 parts), 5-phenylpenta-2,4-dienoic acid (174 parts), diethylene glycol (53 parts), hydroquinone (1 part) and sulphuric acid (2 parts) was refluxed for 2½ hours and the water formed by the esterification reaction was removed continuously by means of a Dean and Stark separator. After this time, the calculated volume of water had collected. The residue was cooled and stirred with a mixxture of sodium chloride (50 parts), sodium carbonate (25 parts), water (200 parts) and ethanol (50 parts) for 15 minutes. The organic layer was then separated, dried and the solvent removed by heating under reduced pressure. There remained 18 parts of a brown oil, identifiable by its infra-red spectrum as ethylene glycol bis(5-phenylpenta-2,4-dienoate).

A mixture of 232 parts of pentachlorophenyl glycidyl ether (containing 2.75 epoxide equiv./kg.) and 115.5 parts of dimethyl phosphite was heated with stirring under reflux for 21 hours at 140°–150° C. Within this time refluxing gradually ceased, and the epoxide content of the reaction mixture diminshed to less than 0.1 equiv./kg. There was obtained a pale yellow adduct (432 parts) substantially solid at room temperature and consisting predominantly of dimethyl 1-pentachlorophenoxy-2-hydroxy-propylphosphonate.

The adduct so obtained (172 parts), maleic anhydride (294 parts), tetrachlorophthalic anhydride (286 parts), ethylene glycol (130 parts), propylene glycol (160 parts), toluene-p-sulphonic acid (5 parts) and toluene (400 parts, by volume) were heated under reflux, and water formed during the course of the reaction was separated. After the mixture had been heated for 32 hours water was no longer evolved. Toluene was removed under vacuum from the reaction mixture: the solid residue (961 parts) had a double bond content of 3.23 equiv./kg.

The polyester resin ("Polyester B") so obtained (15 parts) was heated to 130° C. and ethylene glycol bis(5-phenylpenta-2,4-dienoate) (7.3 parts) was stirred in. The mixture, when cast into an aluminium mould and heated for 2 hours at 140° C. and then for 15 hours at 180° C., formed a cured resin having a Martens value of 70° C.

EXAMPLE IV

To 15 parts of "Polyester B" heated to 130° C., was added diethylene glycol disorbate (5.5 parts) with stirring. The mixture was poured into aluminium moulds and heated to form a cured resin having a Martens value of 48° C. after 2 hours at 140° C.; this value rose to 93° C. after heating for a further 15 hours at 180° C.

EXAMPLE V

A liquid polyester resin, "Polyester C," having a double bond content of 1.90 equiv./kg. was prepared as described in Example VI of British patent specification No. 880,403. To 16 parts of "Polyester C" heated to 80° C., was added diethylene glycol disorbate (3.6 parts) while stirring. The mixture was poured into aluminium moulds and heated to give a cured resin having a Martens value of 43° C. after 2 hours at 140° C.; this value rose to 64° C. after a further 15 hours at 180° C.

EXAMPLE VI

Sorboyl chloride (103 parts) was added slowly to an ice-cold, well stirred mixture of hexamethylenediamine (80 parts) and pyridine (100 parts). The mixture was heated to 70° C. for 3 hours and left for 2½ days. Water (250 parts) was then added, and the material poured into cold water (3000 parts). The finely-divided solid product was filtered off, washed with water and re-crystallized from methanol (5000 parts). The recrystallized product was shown from its infra-red spectrum and elementary analysis to consist of hexamethylene disorbamine.

To "Polyester A" (24 parts), heated to 160° C. was added a solution of hexamethylene disorbamide (3.7 parts) in γ-butyrolactone (20 parts). The resulting mixture had a gelation time of 76 minutes at 160° C.

EXAMPLE VII

Sorbyl alcohol (10.4 parts) and pyridine (20 parts) were stirred together while cooling in ice. Sorboyl chloride (16 parts) was then added slowly over 30 minutes. The mixture was stirred for 2 hours at 70° C. cooled, and diethyl ether (60 parts) and water (60 parts) were added. The ether layer was removed, and the water layer washed with ether (50 parts). The combined ether layers were washed rapidly with ice-cold 10% hydrochloric acid (3×50 parts), then with 10% sodium carbonate solution (3×50 parts). Hydroquinone (0.1 part) was added, the solution dried with sodium sulphate, and the ether removed by warming under reduced pressure. The dark-coloured oil (15.6 parts) remaining was redistilled, and the fraction having a boiling point of 83° C. at 1 mm./Hg. identifiable by the ester-carbonyl-band in its infra-red spectrum as sorbyl sorbate, was collected.

"Polyester A" (12 parts) was melted at 110° C. and sorbyl sorbate (2.5 parts) stirred in. The mixture was poured into an aluminium mould and heated to 140° C. for 1 hour, to form a cured resin having a Martens value of 70° C. On further heating for four hours at 140° C. the Martens value increased to 83° C.

EXAMPLE VIII

A mixture of maleic anhydride (156.9 parts), phthalic anhydride (156.9 parts), phthalic anhydride (355.5 parts), ethylene glycol (129.1 parts) diethylene glycol (339.5 parts) and hydroquinone (0.1 part) was heated to a maximum internal temperature of 200° C. with efficient stirring while nitrogen was passed therethrough. When water no longer distilled, a vacuum of 120 mm. Hg was applied to the mixture and heating continued for another 4 hours. The residue was then cooled. The resultant product, "Polyester D," had a double bond content of 1.61 equiv./kg. To 24 parts of "Polyester D," heated to 70° C., was added sorbyl sorbate (3 parts) with stirring. The mixture had a gelation time of 42 minutes at 140° C.

EXAMPLE IX

"Polyester D" (20 parts) was heated to 160° C. and a solution of hexamethylene disorbamide (3.6 parts) in γ-butyrolactone (20 parts) was added. The mixture had a gelation time of 83 minutes at 160° C.

EXAMPLE X

"Polyester B" (15 parts) was heated to 120° C. and ethylene glycol disorbate (5 parts) was added with stirring. The mixture was poured into an aluminium mould and heated to 140° C. for 4 hours, to give a cured resin having a Martens value of 65° C. and possessing high flexural strength.

EXAMPLE XI

"Polyester A" (14 parts) was heated to 120° C. and bis(4,4-dichlorobuta-1,3-dienyl)-ketone, (4 parts) (prepared as described in Izvest. Akad. Nauk, S.S.S.R., Otdel. Khim. Nauk, 1962, 287) was added with stirring. The mixture was heated to 140° C., at which temperature it gelled after 168 minutes.

EXAMPLE XII

"Polyester A" (10 parts) was heated to 130° C. and to it was added ethyl isodehydroacetate (5 parts) with stirring. The resulting liquid was applied by means of a 200μ triangular surface-coating applicator to glass sheets, and cured at 180° C. The film produced reached a maximum constant hardness of 220±10 seconds (measured by the König method) after 30 minutes. After a total heating period of 4 hours, none of the film dissolved on being rubbed hard 20 times with an acetone-soaked cotton-wool swab.

EXAMPLE XIII

Ethylene glycol bis(1,4-dihydrobenzoate) was prepared by heating 1,4-dihydrobenzoic acid and ethylene glycol with sulphuric acid in benzene. Water produced by the esterification was removed as its azeotrope with benzene. The product was isolated by neutralising and drying the reaction mixture, and distilling off the benzene.

The ester so obtained (2.5 parts) was added with stirring to "Polyester A" (13.8 parts) heated to 120° C. The mixture, on heating to 140° C., had a gelation time of 261 minutes.

EXAMPLE XIV

A mixture of pentaerythritol (136 g., 1 mole), sorbaldehyde (192. g., 2 moles), methylene chloride (200 ml.) and 20% sulphuric acid (2 ml.) was heated and stirred in an apparatus fitted with a water entrainer. Water (34 ml., i.e. 88% of the theoretical amount required for diacetal formation) was collected. Solid sodium bicarbonate was then added to neutralize the acid, and the mixture was filtered. Evaporation of solvent from the filtrate yielded a dark brown viscous liquid; this was extracted into light petroleum, and solvent was then evaporated from the petrol-soluble material to yield a pale yellow product (128 g.), whose infra-red spectrum indicated the presence of only small amounts of hydroxylic impurities.

A mixture of this product (18 g.) and "Polyester A" (40 g.) was heated and stirred until a homogeneous mixture was obtained; this was then cast into an aluminium mould and was heated for 3 hours at 140° C. A hard, infusible, pale yellow casting having a Martens value of 54° C. resulted.

EXAMPLE XV

"Polyester A" (15 parts) was heated to 120° C. and diethylene glycol bis(5-phenylpenta-2,4-dienoate) (6.4 parts) was added with stirring. The resulting mixture was poured into an aluminium mould and heated for 18 hours at 140° C. to give a cured resin having a Martens value of 69° C.

EXAMPLES XVI–XXI

Six further unsaturated polyesters were prepared in the following manner. A mixture of phthalic anhydride, maleic anhydride, and the specified diol was heated and stirred under nitrogen at 150°–180° C. for 6 hours, during which time water was removed from the reaction mixture through a lagged Vigreux column. The pressure was reduced gradually to a final value of 15 mm. Hg to remove the last traces of water. The quantities and reactants used are shown in Table I below.

*Table I*

| Polyester | Phthalic Anhydride (g.) | Maleic Anhydride (g.) | Diol Name | Diol (g.) | Acid Value of Final Product (mg.KOH/g.) |
|---|---|---|---|---|---|
| E | 444 | 294 | Propylene glycol | 501.6 | 47 |
| F | 444 | 294 | Butylene glycol | 594 | 35 |
| G | 334 | 367 | ___do___ | 594 | 20 |
| H | 222 | 441 | ___do___ | 594 | 37 |
| I | 334 | 367 | Propylene glycol | 602 | 25 |
| J | 222 | 441 | ___do___ | 602 | (¹) |

¹ Not determined.

These polyesters were hardened by being heated with diethylene glycol disorbate; the quantities used and the results are shown in Table II below.

*Table II*

| Example No. | Polyester Name | Polyester (G.) | Sorbate Diester | Cure Cycle (° C./hrs.) | Appearance of Cured Product | Martens Value (DIN; ° C.) | Flexural Strength (VSM; kg./mm.²) | Impact Strength (VSM; cm. kg./cm.)² |
|---|---|---|---|---|---|---|---|---|
| XVI | E | 70 | 28 | 150°/16 hr.+180°/3 hr. | Pale yellow | 33 | 5.5 | 1.5 |
| XVII | F | 70 | 27.4 | 150°/16 hr. | Pale brown, infusible | | | |
| XVIII | G | 65 | 30.2 | 150°/16 hr. | Brown | 35 | 6.9 | 11.2 |
| XIX | H | 60 | 34.5 | 150°/16 hr. | ___do___ | 33 | 3.9 | 15.2 |
| XX | I | 65 | 30 | 150°/16 hr. | ___do___ | | 1.5 | 5.5 |
| XXI | J | 60 | 34.2 | 150°/16 hr. | Brown, infusible | | | |

EXAMPLE XXII

Butane-1,4-diol bis(1,2-dihydro-3,4,5,6-tetrachlorobenzoate) (4 g.) was mixed with "Polyester E" (4.8 g.); after being heated for 20 hours at 180° C., the mixture had gelled to a brittle, infusible product.

EXAMPLE XXIII

A mixture of "Polyester A" (8.0 g.), diethylene glycol disorbate (5.0) and diallyl maleate (6.0 g.) was poured into an aluminium mould and heated for 4 hours at 140° C. An infusible resin was obtained, which was flexible at room temperature.

EXAMPLE XXIV

A mixture of "Polyester A" (15.0 g.), diethylene glycol disorbate (4.0 g.) and propyl sorbate (1.5 g.) was cast into a mould and heated for 2 hours at 140° C. and then for 15 hours at 180° C. A hardened resin having a Martens value of 66° C. was obtained.

What is claimed is:

A heat hardenable composition of matter which comprises
(a) a 1,3-diene selected from the group consisting of the glycol dihydrobenzoates, the pentaerythritol-sorbaldehyde acetals, the sorbyl sorbates and bis(dichlorobutadienyl) ketone and
(b) an unsaturated polyester which is obtained by the condensation of at least one saturated aliphatic polyalcohol with at least one ethylenically unsaturated dicarboxylic acid anhydride and at least one other dicarboxylic acid anhydride.

References Cited by the Examiner
UNITED STATES PATENTS 2,606,910  8/1952  Herzfeld et al. _____ 260—346.6
3,078,253  2/1963  Davies et al. _____ 260—75
3,092,641  6/1963  Leon _____ 260—75

MURRAY TILLMAN, *Primary Examiner.*

J. T. GOOLKASIAN, *Assistant Examiner.*